United States Patent
Abner

[15] 3,654,674
[45] Apr. 11, 1972

[54] FLEXIBLE PROTECTIVE COVER FOR ELASTIC BAND AND METHODS OF INCORPORATION AS A PART OF OR ATTACHING TO FLEXIBLE COVERS, TUBES, PROTECTIVE WEAR, ETC.

[72] Inventor: Willard Abner, P.O. Box 100, Woodland Hills, Calif. 90220

[22] Filed: July 28, 1970

[21] Appl. No.: 58,755

[52] U.S. Cl. ........................................................... 24/243 K
[51] Int. Cl. ............................................................. A44b 21/00
[58] Field of Search ................... 2/221; 24/73 CF, 17 B, 16 R, 24/243 K, 243 N, DIG. 4; 267/69

[56] References Cited

UNITED STATES PATENTS

| 1,527,383 | 2/1925 | Solliday | 24/243 K UX |
| 2,117,322 | 5/1938 | Hillman | 267/69 |
| 2,132,616 | 10/1938 | Hardie | 267/69 X |
| 3,414,907 | 12/1968 | Flame | 2/221 |

*Primary Examiner*—Donald A. Griffin
*Attorney*—Clarence A. O'Brien and Harvey B. Jacobson

[57] ABSTRACT

A flexible protective cover employing an elongated rubber band in a protective sleeve employed as a part of or attached to various types of flexible covers, protective wear such as shower caps, gloves, rain wear, boots, tubular members and the like. The method and procedure for assembling the rubber band with the sleeve and the apparatus for accomplishing the assembly so that the elastic material will be covered while is is held in an elongated position so that it will have the retractability and complete working ability of a non-protected rubber band.

19 Claims, 17 Drawing Figures

DIELECTRIC HIGH FREREQUENCY HEATING

Willard Abner
INVENTOR.

Willard Abner
INVENTOR

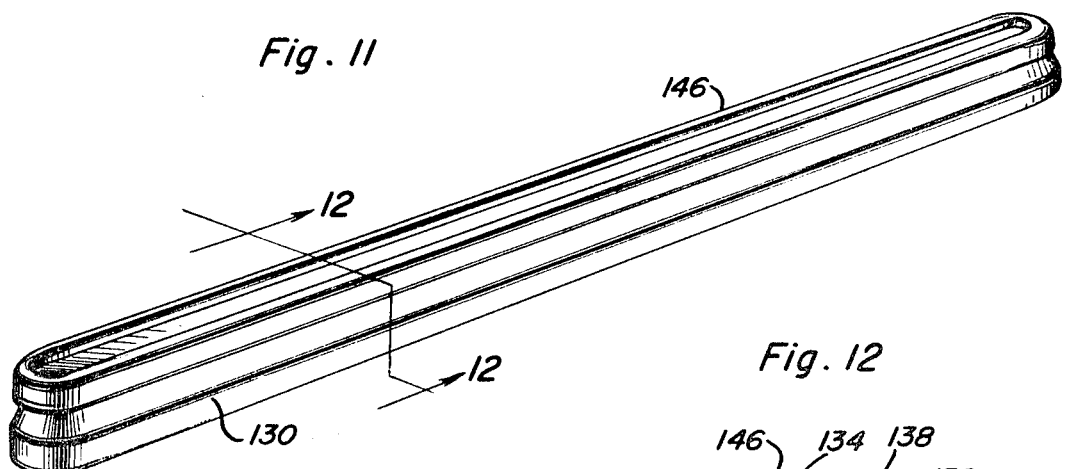
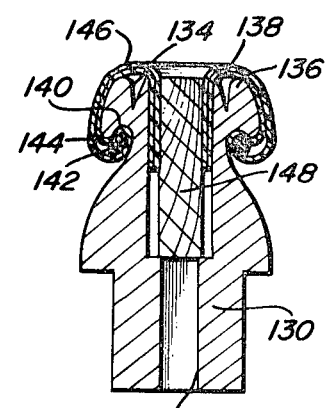
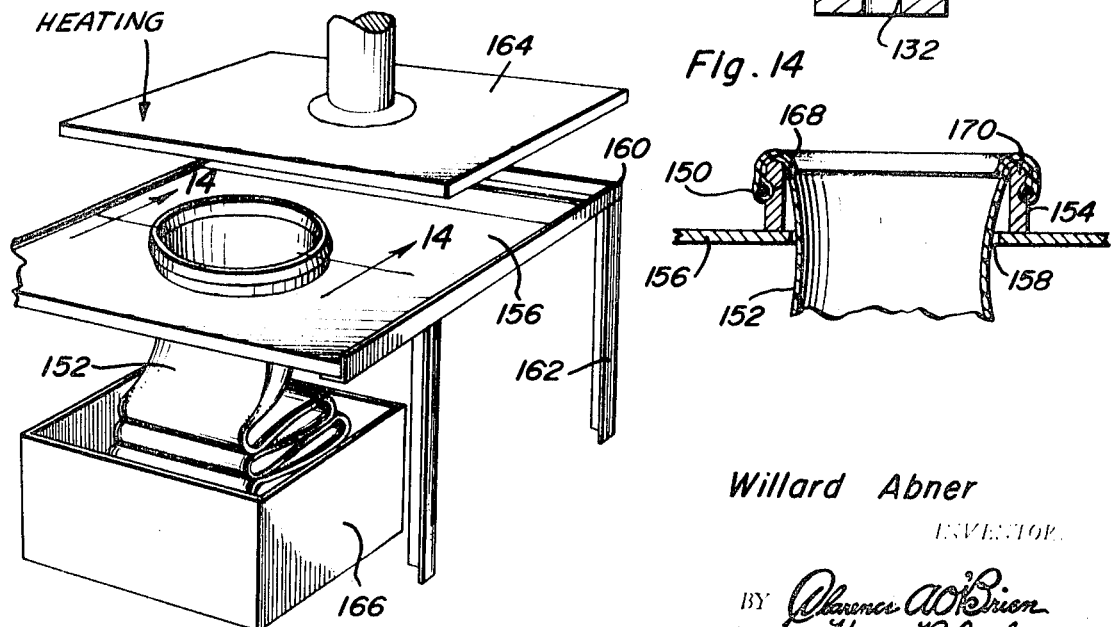
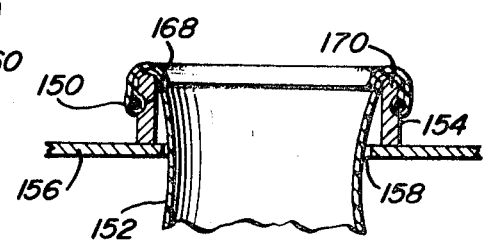

Willard Abner
INVENTOR.

BY Clarence A. O'Brien
and Harvey B. Jacobson
Attorneys 3,654,674

FLEXIBLE PROTECTIVE COVER FOR ELASTIC BAND AND METHODS OF INCORPORATION AS A PART OF OR ATTACHING TO FLEXIBLE COVERS, TUBES, PROTECTIVE WEAR, ETC.

BACKGROUND OF THE INVENTION

1. Field of the Invention

This invention generally relates to a flexible protective cover, the process of making such a cover and the apparatus used in the process of making the cover in which the cover is protective and may also be decorative and includes an ease of installation and removal rendering it capable of many and varied uses.

2. Description of the Prior Art

Various items, particularly irregular items have presented difficult problems when covering and protecting such items from atmospheric weather conditions and the like. Various types of drawstrings, ropes, capes and other methods of attachment have been provided for holding such covers in place. Frequently, grommets, snaps or other fastening devices incorporated into relatively thin and inexpensive materials will pull out or rupture under stress thus rendering the cover ineffective.

SUMMARY OF THE INVENTION

The present invention generally relates to a rubber band completely protected by a flexible cover or sleeve incorporated into or attached to a flexible cover together with apparatus and procedures employed in covering the elastic material or rubber band while it is held in a maximum or less elongated position so that it will have the retractability and complete working ability of a non-protected rubber band with the protected rubber band being installed in or incorporated into various cover devices, rain garments, tubular members or the like.

An object of the invention is to provide a flexible cover having a rubber band associated therewith in which the rubber band is completely enclosed in a protective sleeve and is incorporated into the sleeve while the rubber band is stretched or elongated.

Another object of the invention is to provide an apparatus for forming the flexible cover having the protected rubber band incorporated therein or attached thereto.

A further object of the invention is to provide a method of attaching or incorporating a protected rubber band into a cover, garment, tubular member or the like.

DESCRIPTION OF THE DRAWINGS

FIG. 11 is a perspective view of a die and associated material employed in forming the flexible sleeve and resilient band combination illustrated in FIG. 10.

FIG. 12 is a sectional view of the assembly of FIG. 11 taken substantially upon a plane passing along section line 12—12 of FIG. 11.

FIG. 13 is a perspective view illustrating an apparatus for forming a sleeve and incorporating an elastic band on the end of a tubular member.

FIG. 14 is a sectional view taken substantially upon a plane passing along section line 14—14 of FIG. 13 illustrating the structural details of the metal die and associated structure.

DESCRIPTION OF THE EMBODIMENTS

Before describing the specific embodiments of the invention, it is pointed out that various items may be provided with a decorative, protective type cover that incorporates both the rapid ease of installation and removal without incumberances. Properly compounded material, for example, vinyl could be used for the cover material as vinyl is an excellent shield against ozone, moisture, salt air, gases and other deleterious atmospheric elements. Further, ultra-violet rays can be screened by properly pigmenting the cover material. Also, the cover material provides protection against sand, dirt, grease and the like. Other flexible or semi-flexible materials having some elastic-like ability, such as rubber, polyethylene, other plastics, cloth, paper and the like can be used as the cover material. Primarily, the cover provides an attractive, form-fitting moisture-proof barrier for various items covered. For example, rubber tires, both mounted and unmounted, stored indoors or subjected to atmospheric elements under outside exposure, such as spare tires on vehicles, in the trunk or spare tire compartments, will be effectively protected by the cover. Of course, other items may be effectively covered to maintain protection against corrosion, weather damage and the like. By incorporating a rubber band into a sleeve at the opening of the cover, the cover may be stretched over the intended item to be protected and the opening then self-retracting so that the cover will be securely held in position. With this construction, the cover can be easily removed without damage for re-use.

Inasmuch as rubber bands or rubber under stress are receptive to attach by ozone and weather damage and since the cover is not effective without the retractable feature of the rubber band, the rubber bands are completely sealed into the sleeve so that it may be protected for long life expectancy. It is also noted that rubber bands or elasticized bands incorporated in any manner without being completely protected and sealed against moisture and vapor will fail almost immediately if subjected to outdoor exposure due to damage by ozone and weather. Moreover, more protection is required in urban areas and in open storage conditions due to atmospheric conditions. Most damaging to rubber is the high concentration of ozone which is formed in the atmosphere as a result of various conditions such as electrical discharge into the air. By using the sleeve around the rubber band, it will operate effectively for as long as the expected life of the vinyl cover material subjected to normal outdoor weather exposure.

Figure 1:
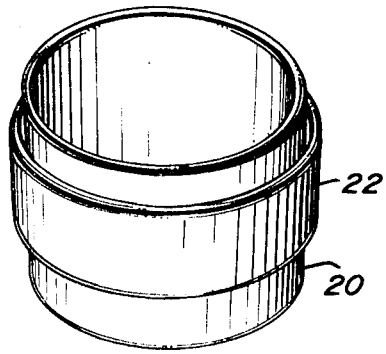
FIG. 1 is a perspective view of an intermediate procedure in forming a sleeve and the end or ends of a flexible tubular member.

Referring now specifically to the drawings, FIG. 1 illustrates the positioning of a tubular skirt of flexible material on a circular metal die. The tubular material 20 is inserted through the metal die 22 with both ends thereof extending beyond the metal die. Either one or both ends of the tubular material 20 are drawn back over the ends of the metal die and pulled down on the outside of the die 22 with the end portions of the tubular material 20 being designated by numeral 24 in FIG. 2. It is noted in FIG. 1 that the circumference of the tubular material is smaller than the internal circumference of the die so that when the end portions 24 are pulled over the ends and down the sides of the die, a stress will occur holding it in place. The tubular material 20 should be approximately 5 percent less in circumference than the die to develope the proper holding technique. Also, the die 22 and the tubular material or skirt are not necessarily cylindrical in configuration since other annular configurations may be employed.

Figure 2:
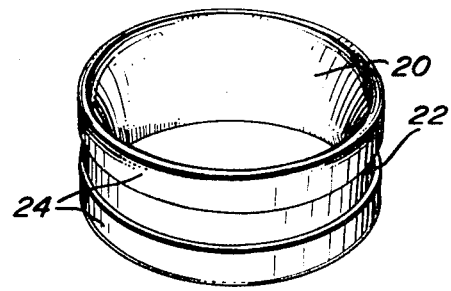
FIG. 2 is a perspective illustrating the relationship of the tubular member to the die when the skirt of the tubular member is stretched over both ends of the die.
Figure 3:
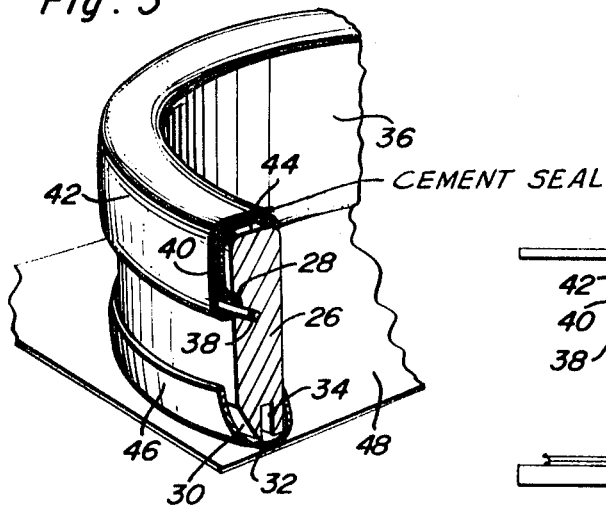
FIG. 3 is a perspective view, in section, illustrating the orientation of the metal die, the tubular material, elastic band and sealing edge.

FIG. 3 illustrates a metal die 26 which may actually be the die 22 illustrated in FIGS. 1 and 2 which has a peripheral recess 28 on the exterior thereof adjacent to but spaced from one end edge and the bottom edge of the die is provided with a beveled external surface 30 defining a tear edge 32 exteriorly of the groove-like structure 34. In this assembly, the skirt material 36 is drawn through the die 26 in the same manner as in FIG. 1 and pulled over both ends of the die. At this point, the rubber band, or endless elastic member 38 is stretched and centered on top of the overlapping skirt material 40 in alignment with the groove 28 with the band having a tendency to pull the skirt material into the recess groove 28 of the die 26 in a holding position so that the end portion 42 of the skirt material 36 can be pulled back up over the rubber band 38 and over the top sealing edge 44 of the die. At this point, a uniqueness occurs in that the material that is pulled back over the sealing edge 44 of the die, due to the stress of the material itself and the pull of the rubber band, pulls firmly into place during the sealing operation. At this point, the rubber band 38 has been enclosed into its sleeve awaiting the sealing process. On the other end of the die, the other end 46 of the skirt has been pulled over and around the bottom sealing edge which incorporates both a sealing surface and the tear seal 32.

A sheet of bottom material 48 is placed on the bottom portion of a press platen 50 and the die 26 with the skirt material thereon is placed on top of the sheet. A top plate or platen 52 actuated by a suitable structure 54 is forced down upon the top of the die and exerts pressure at the same time on the bottom portion of the die in contact with the bottom platen 50. At this time, both the top and bottom seals can be made by dielectric high frequency heating or by impulse electric heating of the platen 50 and 52. When the press is opened, the rubber band 38 has been sealed into a sleeve and the bottom portion of the skirt has been attached to the bottom material 48. Due to the tear seal feature 32 at the bottom of the die, the excess trim material is simply torn away and the cover is complete. It is pointed out that in making the cover, the length of the skirt material 36 is not necessarily governed by the height of the die since any excess material can be held inside of the die by snaps attached to the die itself and then fastened to the material or a flexible piece of wood or plastic, slightly longer than the diameter of the die can be bent and placed inside the die and the tension will hold it and the excess material in position during the process of sealing. Thus, the invention involves not only the procedure of incorporating the band and forming the complete cover but also the use of the specific die itself.

Figure 4:
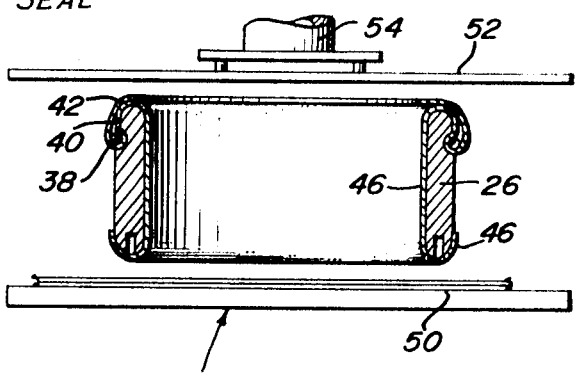
FIG. 4 is a schematic view of the press platens which are heated and associated with the assembly of FIG. 3.

Rather than employing a single step operation using one die, two separate operations using two separate dies may be employed that is, one, for the purpose of sealing the rubber band into a sleeve and the other sealing the bottom material to the bottom of the skirt. In this construction, see FIG. 6, the die 56 has a peripheral groove 58 in the exterior thereof spaced from the bottom sealing edge 60. The skirt material 62 is placed inside of the die and prevented from going on through the die by a non-metallic bottom or screen 64 just below the contact edge of the die and platen. In each procedure, the one end of the skirt is pulled over the sealing edge and positioned around the outside of the die. On the end requiring the band, the skirt material will necessarily have to extend down and around the outside of the die to approximately one inch so there will be ample material to pull back over the sealing edge as indicated by numeral 66 in FIG. 6. The material on the tear seal die should extend over the sealing edge and up the outside of the die one-quarter inch to three-eighths inch or just enough to hold firmly in position in the same manner as the lower edge of the skirt material illustrated in FIGS. 3 and 4. The bottom should be sealed to the skirt first and after the trim has been removed, the bottom and the skirt would then be placed in the band forming die and the rubber band then installed through the procedure as previously outlined. The manner of forming the bottom in the skirt 62 in FIG. 6 is not illustrated but it appears clear that the same procedure employed in FIGS. 3 and 4 is utilized to secure the bottom material to the skirt.

Figure 5:
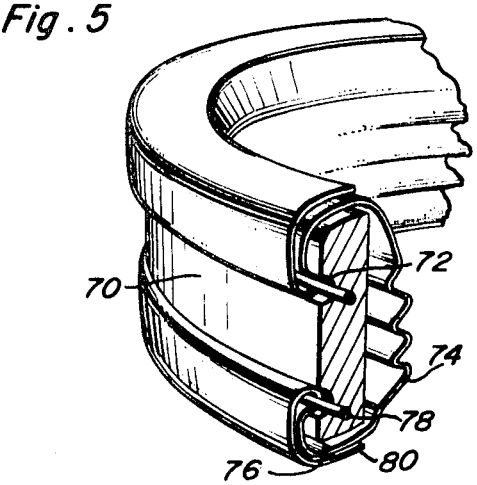
FIG. 5 is a perspective view in section illustrating elastic bands at both ends of the tubular flexible member and illustrating a fullness in the skirt of the tubular member.

FIG. 5 illustrates a one-step operation using a single die 70 having a recess or groove 72 adjacent the top and bottom sealing edges thereof and this involves a length of skirt material 74 inserted through the die with the end portions folded over the sealing edges and extending along the external surface of the die to a point inwardly of the groove with this portion of the skirt being designated by the numeral 76. Endless elastic members, or bands 78 are then placed around the material and the skirt material folded back over the sealing edges as at 80 with the band being enclosed in the sleeve and the sleeve attached to the skirt. This type of structure could be employed in a tube that could be stretched over and tightly engaged upon the opening of a duct and the other end could be pulled through or around an obstructed opening and attached to a continuing duct on the other side for transmission of the air, gases and the like. Due to the rubber bands having been installed in the sleeve in a stretched condition, the expendable retractable opening develops a firm hold on objects down to one-fifth of the circumference of the cover. Using a short skirt and a rubber band installed in both ends, a tire cover is formed allowing the wheel to be exposed on both sides so that the wheel could be fastened to a spare tire mount without interfering with the cover.

Figure 6:
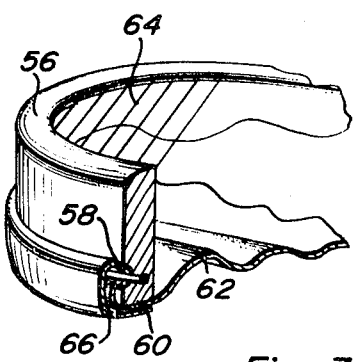
FIG. 6 is a perspective view in section illustrating the manner of forming a sleeve with an elastic band thereon on the skirt portion of material having a larger diameter than the metal die.

In FIG. 6, it is noted that the one-step operation is shown therein in which the skirt 62 actually may be in the form of a bottom or substantially flat sheet thus forming a resulting cover which would be substantially a lay flat sheet with a rubber band attached in the sleeve that is constructed of the same identical piece of material as the cover or lay flat sheet 62.

Figure 7:
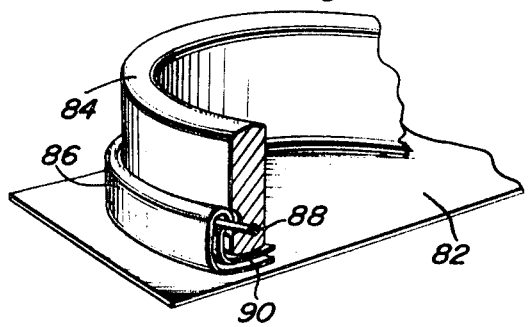
FIG. 7 is a perspective sectional view similar to FIG. 6 but illustrating the sleeve being formed with the elastic band therein and a bottom material sealed thereto by the die.
Figure 10:
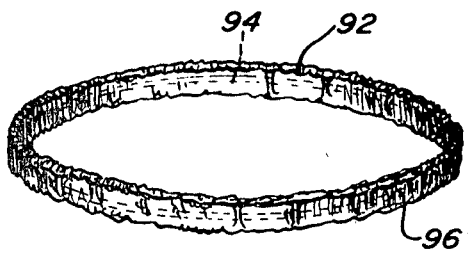
FIG. 10 is a perspective view of the sleeve with the elastic band therein.

FIG. 7 illustrates a similar arrangement in which a bottom panel 82 extends under the die 84 and is heat sealed to the sleeve 86 which encompasses the stretched rubber band 88. The skirt material 86 is relatively short but of sufficient length to be pulled back over the sealing edge as at 90 so that the sleeve will be formed at the same time the bottom 82 is joined thereto. If the assembly of FIG. 7 is used without the bottom material and assuming that the rubber band 88 has been stretched 500 percent of its relaxed length, the sleeve which had been completely sealed around the elastic band would result in the excess sleeve material remaining as it would be and not trimmed. Thus, rather than using a sealing edge as illustrated in FIG. 7, the sealing edge tear seal principle illustrated in FIGS. 3 and 4 would be used except that the sealing edge and tear seal would be reversed so that the trim edge would be on the inside thus trimming the sleeve covering the rubber band. After removal from the die, the rubber band would retract itself and the sleeve could be snapped around, elongated, pulled over and used as a band holder or draped over covers and for many uses where up until now a flexible holding type rubber band could not be used if exposed to outdoor or deleterious conditions such as being in the presence of concentrated ozone, gases, oil, greases and the like. Properly compounded sleeve materials with a high degree of heat resistance, chemical resistance or the like could be installed over the rubber band for specific uses. FIG. 10 illustrates such a flexible sleeve 92 with endless elastic member, or the rubber band 94 completely enclosed therein and the excess material of the sleeve 92 is gathered as indicated at 96. Thus, there is provided a sleeve that completely encloses a rubber band for its protection from deterioration. The sleeve may encompass the rubber band by any of various methods such as heat sealing, sewing, or other sealing with the rubber band being enclosed while the rubber band is held in an elongated position that automatically results in the cover or sleeve having the characteristics to be pulled up and folded into a smaller dimension by the retraction of the rubber band while at the same time the cover will protect the rubber band to its fullest elongated dimensions.

Figure 8:
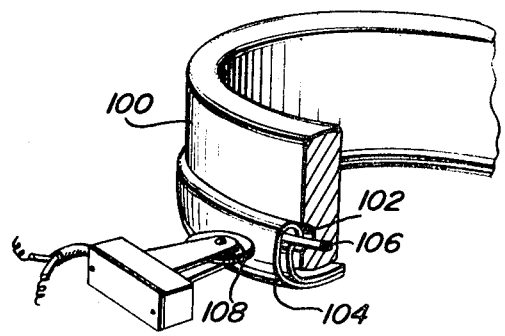
FIG. 8 is a perspective sectional view similar to FIGS. 6 and 7 but illustrating the roller type heat sealer associated with a rotatable die.

FIG. 8 illustrates a die 100 which is rotatable and which includes a groove 102 in the exterior thereof receiving a sleeve of material 104 that has a rubber band 106 disposed therein in the same manner as in FIG. 7. In this construction, the die is rotatable against a heated sealing wheel 108 which may be heated in any suitable manner. Rather than the die being rotated, it can be stationary and the wheel 108 rotated around the die. The method of heating the wheel 108 is variable and the band 106 will be elongated while being sealed in the sleeve 104.

Figure 9:
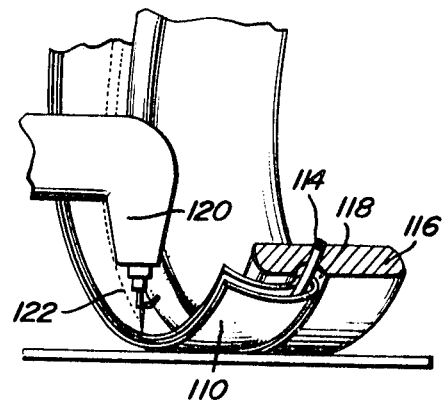
FIG. 9 is a perspective sectional view illustrating the elastic band incorporated into a sleeve by employing a stitching operation.

FIG. 9 illustrates another embodiment of forming a sleeve 110 for a rubber band 114 associated with a die 116 which in this instance is oriented vertically with the rubber band 114 being elongated and received in a groove 118 in the same manner as in the other embodiments of the invention. The edges of the skirt 110 are secured together by a sewing device 120 which leaves a line of stitching 112 securing the elongated rubber band 114 in a sleeve.

It is pointed out that rigid or semi-rigid plastic or metal bands could be covered or installed at the bottom of the skirt using the same principles discussed previously in connection with the installation of rubber bands.

If an inflatable member is to be formed, the die will have a tear seal such as 32 in FIGS. 3 and 4 at each end thereof with each end of the skirt being engaged with a lay-flat sheet of material that is, one flat sheet can be placed over the top of the skirt and die and one at the bottom and the sealing sequence performed which will then seal a top and bottom sheet to a tubular skirt thus forming a tubular closed member. If an air valve is installed on the skirt or on one of the ends prior to sealing, an inflatable container may be assembled in one sealing sequence. A filled container for liquid or other material could be accomplished by sealing the bottom onto a tubular skirt first, filling the tubular skirt and then placing a lay-flat top over the top of the container and die and then sealing the top to the tubular skirt or container filled with material. Also, a draw string could be employed rather than the rubber band in which event a notch would be cut in the skirt material for the ends of the drawstring would remain outside of the sleeve. The drawstring would be snugged around the skirt in the same manner as the rubber band and would enable sealing of the drawstring in the same manner as the rubber band.

Thus, the formation of the sleeve and in the same operation enclosing a rubber band within the sleeve as disclosed previously may be employed regardless if the sleeve is attached to or unattached in relation to a skirt or to a tubular member. The rubber band is elongated to the maximum degree and covered with the sleeve and thus develops a self-retracting feature and also permits maximum elongation of the band without breaking or without being restricted by the sleeve.

FIGS. 11 and 12 disclose a procedure and apparatus for forming an elongated band enclosed in a sleeve similar to that illustrated in FIG. 10. In this construction, an elongated metal die 130 is employed which has a vertically extending passageway 132 therethrough. As illustrated in FIG. 12, the top edge of the periphery of the metal die 130 includes a groove 134 which defines an outer sealing edge 136 and an inner trim seal edge 138 which is relatively sharp. Disposed on the outer periphery of the die 130 below the top edge thereof, there is provided a peripheral recess 140 which receives a rubber band 142 disposed in a folded sleeve 144 of flexible cover material. The folded sleeve 144 includes portions 146 which extend over the sealing edge 136 and the trimming edge 138 and downwardly into the hollow interior of the die 130.

This construction, which uses the die having a trim or tear seal edge on the inside and a sealing edge on the outside of the top edge thereof, results in a fully expanded rubber band being installed within an enclosed protective cover or sleeve. The cover material is trimmed and sealed around the band in a manner which allows the rubber band to be stretched over objects without harming the protective cover inasmuch as the rubber band is fully expanded and the cover material is of a size to encircle the die. In this construction, the sleeve 144 is not a part of a skirt or cover and the die is so constructed as to neatly trim the cover material around the rubber band. Thus, rubber bands in various lengths, widths and strength can be incorporated into the sleeve for various purposes and are not necessarily directed to outdoor use since an elongated rubber band under stress used indoors also will have an increased life expectancy when covered.

The flexible band formed by using the die illustrated in FIGS. 11 and 12 may be of various shapes or configurations depending upon the shape and configuration of the die and the sleeve material. The sleeve material 144 is stretched over the metal die and the sealing and trimming of the sleeve 144 is accomplished in the same manner as in the other embodiment of the invention, that is, by employing an electrically heated sealing platen and forcing it against the sealing and trimming edge of the die. In this construction, the rubber band 142 is retained at proper elongation during the sealing process of the band inside of the protective sleeve allowing expansion of the opening or area encompassed by the sleeve to be the maximum permitted by the dimensions of the sleeve without damage to the band or sleeve. The band formed when relaxed will be substantially as illustrated in FIG. 10. This type of band may be employed for various purposes. For example, if a tarpaulin covering is provided for a palletized load, the lower free edge of the tarpaulin could be snugged around the load or pallet by employing an elongated flexible band for this purpose.

In the event tension on the sleeve or covering material is not sufficient to hold it securely in position on the die during the installation and sealing sequence which could occur when a long die is used or the sleeve material does not have enough elasticity, a holding insert or wedge made exactly to fit snug inside of the die may be provided for retaining the sleeve material on the die. The retaining member 148 is constructed of wood, plastic or other non-conducting material exactly fits snug inside of the die to hold the end edges of the sleeve material 144. Assuming the sleeve or cover material is 0.008 inches in thickness and that two layers or 0.016 inch thickness is on both sides of the die at the time the wedge 148 is inserted to hold the material in place during the sealing sequence, the wedge 148 would of necessity have to be slightly less in width than the opening of the die minus the 0.032 inches thickness of the four layers of cover material.

Another type of holder is provided for the edges of the covering material 144 which may be in the form of elongated spring loaded clamps or snap holders fastened to the inside of the die for grippingly engaging the lower edge of the covering material.

FIGS. 13 and 14 disclose the procedure for sealing a rubber band 150 in the end of an elongated flexible tube 152 such as an elongated flexible duct. In this construction, the tube 152 is passed upwardly through a metal die 154 supported on a sliding plate 156 having an aperture 158 therein substantially equal to the internal dimensions of the die 154. The plate 156 is slidably supported in an open top frame 160 supported by depending legs 162 so that the supporting plate 156 may be slid into underlying relation to a heated platen 164 which is heated in the same manner as the other embodiments of the invention. This structure enables the die to be moved out from under the platen 164 for access thereto. There is no limit to the length of flexible tube 152 with the excess length thereof being conveniently stored in a folded condition within a suitable container 166. The die 154 is provided with a groove 168 in the periphery thereof below the upper sealing edge 170 so that the tubular material is passed up through the aperture 158 and the die 154 and pulled downwardly over the outer surface of the die so that the rubber band 150 may be positioned thereon after which the flexible cover material is folded back over the sealing edge 170 of the die 154 and sealed by lowering the platen 164. This does not cut the sleeve but only seals the rubber band therein. The plate 156 may be supported by rollers for ease of movement thereof and any suitable supporting structure may be provided therefor with the supporting plate 156 actually forming the platen in opposed relation to the platen 164.

The assembly illustrated in FIGS. 13 and 14 provides an elongated flexible tube having a rubber band sealed in one end thereof or if desired, a rubber band may be sealed in both ends thereof. This type of tube may be employed as a duct for hot air, cold air, gases, water and the like or wherever it is desired to convey fluids, distribute fluids or the like.

Figure 15:
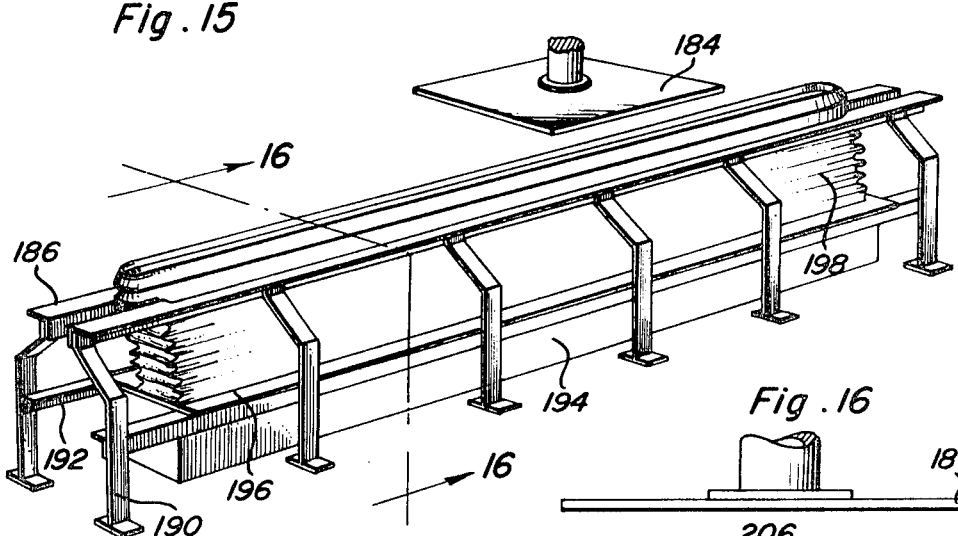
FIG. 15 is a perspective view of an apparatus for incorporating a sleeve and elastic band on the edge of an elongated flexible cover.
Figure 17:
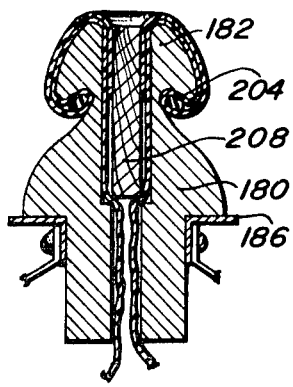
FIG. 17 is a sectional view similar to FIG. 16 but illustrating a wedge structure associated therewith.
Figure 16:
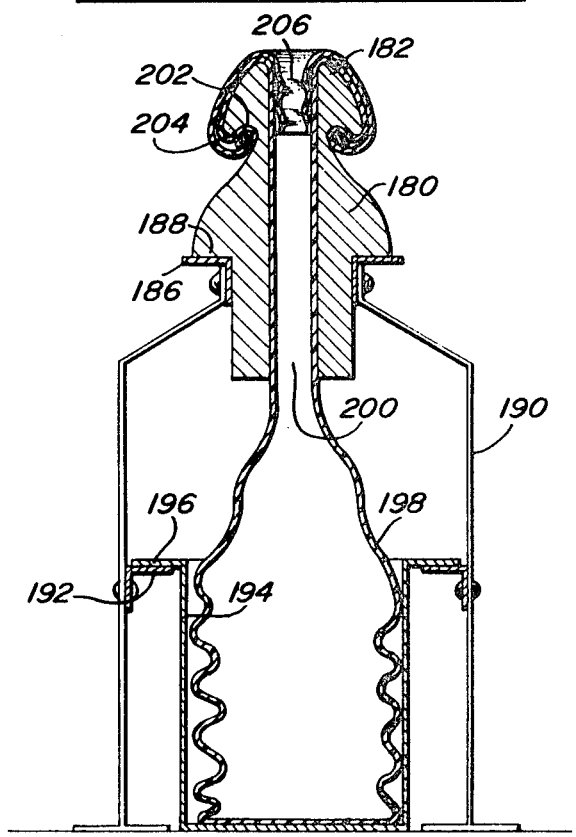
FIG. 16 is a sectional view taken substantially upon a plane passing along section line 16—16 of FIG. 15 illustrating the structure thereof.

FIGS. 15-17 illustrate an apparatus and procedure for providing a rubber band in an enlarged cover by sequential movement of the die and cover in relation to a heated platen. In this construction, the metal die 180 includes elongated sealing edges or bars 182 at the upper end thereof that curve around sharply at each end to form a continuous die and a continuous sealing edge 182. The die thus is oblong in shape rather than circular or square which enables the die to be moved longitudinally under a relatively small platen 184 of a press which has been heated in the usual manner with the die moving in a sequential manner so that multiple seals can be made in order to form a continuous seal in which one seal slightly overlaps the other thus eliminating the use of a large, bulky die and a large platen.

For supporting the die 180, a pair of longitudinal paralle tracks or guides 186 are provided which supportingly engage a downwardly facing shoulder 188 on each side of the die 180. The tracks or guides 186 are supported by suitable supporting legs 190 which extend downwardly and outwardly and which also supports a pair of tracks or guides 192 parallel to the guides 186. The tracks or guides 192 movably support an elongated basket or container 194 which has outwardly extending edge flanges 196 slidingly engaging the top surface of the guides 192 as illustrated in FIG. 16. With this construction, both the die 180 and the basekt 194 are moved longitudinally at the same time and suitable mechanism (not shown) may be provided to automatically move the die and basket or the structures may be moved manually or in any suitable manner.

The basket 194 receives an enlarged cover 198 which has been preformed and placed in the basket with the bottom of the skirt or cover being pulled up through the hollow interior 200 of the die 180 with the free edge thereof then being pulled over the sealing edge 192 and downwardly beyond a peripheral groove 202 exteriorly of the die which also receives a rubber band 204 therein. The free edge of the skirt of the cover 198 is then folded upwardly and back down into the hollow interior of the die with this folded portion being designated by the numeral 206 so that the platen 184 when lowered to engage the sealing edge 182 having the two layers of the skirt material thereon will effectively seal the rubber band in a sleeve at the open end of the cover 198. This arrangement also employs the rubber band being elongated to its greatest practical dimension and, of course, the cover will be elongated to its greatest dimension and actually stretched over the die which elongation or stretching will retain the cover on the die during the sealing sequence. After removing the cover with the rubber band therein from the die, it will retract causing the opening of the cover to be pulled closed to approximately one-fifth the maximum extended opening. The opening of the cover can then be stretched to its maximum for covering purposes without damaging the protective sleeve or the rubber band and the rubber band will continue to be protected and completely enclosed by the sleeve permitting an extended life expectancy of the rubber band even though it is being held in an elongated position subjected to normal outdoor atmospheric conditions. FIG. 17 illustrates the same structure as FIG. 16 except that a wedge 208 has been inserted therein which wedge operates in the same manner as the wedge 148 in FIG. 12. The wedge serves to retain the cover in position during the sealing sequence in the event the positioning of the cover on the die will not sufficiently stress the cover or the cover is of such a material that it will not be self-sustaining on the die.

In actual tests, identical rubber bands enclosed in the protective cover or sleeve of the present invention and subject to normal outdoor exposure in the Los Angeles, Cal. area have remained in good working condition substantially longer than the rubber band exposed to the atmospheric conditions but was not enclosed in the protective cover or sleeve of this invention.

The various structures of the invention may be employed in association with various covers from a size to fit over an automobile or other vehicle, pallets with loads thereon, various vehicular tires, steering wheels, closures for containers, various garments such as gloves, shoes, hats, jackets and the like or wherever it is desirable to provide a flexible cover or enclosure with a resilient band to retain the cover in position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rubber band comprising an endless elastic member, and a flexible sleeve means for completely enclosing said elastic member and being completely sealed for protecting the elastic member from ambient atmospheric conditions thereby effectively protecting the elastic member and extending its life expectancy.

2. The structure as defined in claim 1 wherein said elastic member is elongated and maintained free of the sleeve means when installed in the protective sleeve means with the protective sleeve means extended to its maximum dimension thereby enabling the elastic member to be elongated and the flexible sleeve means extended to its maximum opening to facilitate installation and removal of the elastic member and sleeve means.

3. The method of installing a rubber band in a protective sleeve comprising the steps of placing the sleeve in its fully extended condition peripherally of a die, elongating the rubber band and placing it against the external surface of the sleeve on the die in spaced relation to the edges thereof, holding the sleeve so that the edges thereof overlap and enclose the rubber band, and sealing the overlapping edges of the sleeve with a continuous seal thereby providing a continuous sleeve for the rubber band.

4. The method as defined in claim 3 in which the sleeve is formed as a continuation of a skirt of thermoplastic material with the skirt defining a protective cover, tube or the like.

5. The method as defined in claim 3 including the step of heat sealing the overlapping edges of the sleeve simultaneously with heat trimming the edges of the seal.

6. The method as defined in claim 3 in which the sleeve is formed on the end of an elongated tubular member inserted up through the center of a die and folded outwardly over the top edge of the die and then downwardly along the exterior thereof.

7. The method as defined in claim 3 in which the free edges of the overlapping edges of the sleeve are clampingly engaged during the sealing step for retaining the sleeve in position.

8. The method as defined in claim 3 in which the sealing step is accomplished by a heated platen engaging the overlapping edges of the sleeve.

9. The method as defined in claim 3 in which the sealing step is performed by a heated sealing wheel engaging the overlapping edges of the sleeve while moving the sealing wheel and die rotatably in relation to each other.

10. The method as defined in claim 3 in which the sealing step is accomplished by a continuous peripheral seam formed by a sewing apparatus.

11. The method as defined in claim 3 wherein the step of sealing the cover material together is attained by applying a method selected from the group consisting of dielectric high frequency heating, electrical impulse heated platen, and cementing.

12. An apparatus for forming a protective cover in enclosing relation to an elongated, stressed rubber band comprising a die in the form of an annular member, the external peripheral surface of the annular member having a peripheral groove formed therein, the cover being formed by a sleeve of flexible material disposed in encircling contacting relation with the external surface of the die with the rubber band being stretched and elongated and placed in enclosing relation to the material and pulling it and retaining it in the groove so that the material may be disposed in overlapping relation to enclose the rubber band, and means sealing the overlapping material adjacent the rubber band to form a continuous seal for the stretched rubber band to protect it from ambient atmospheric conditions.

13. The structure as defined in claim 12 wherein said die is in the form of an elongated oval-shaped member, said material being in the form of an enlarged cover having a tubular portion inserted up through the annular member and reversely folded into engagement with the external surface thereof, and means movably supporting the die and the cover to enable longitudinal movement thereof under a relatively small heated platen to form a sequential but continuous seal for the overlapping material.

14. The structure as defined in claim 12 together with clamp means associated with the die for clampingly engaging the overlapping material to retain it in position during the sealing operation.

15. The structure as defined in claim 12 wherein said die includes a sealing edge and a trimming edge adjacent thereto for sealing the overlapping edges of the material and trimming the overlapping edges outwardly of the seal.

16. The structure as defined in claim 12 wherein said die includes a bottom retaining member to retain excess material within the die when the sleeve is being sealed.

17. The structure as defined in claim 12 wherein said die is mounted on a movable plate in underlying relation to a platen whereby the plate may be moved to a position outwardly of the platen to enable access thereto.

18. The structure as defined in claim 12 wherein a heated sealing wheel is associated with the die for sealing the overlapping edges during relative movement between the wheel and die.

19. The structure as defined in claim 12 wherein a sewing device is associated with the die for forming a continuous sealed seam in the material to form a sealed sleeve for the rubber band.

* * * * *